(12) United States Patent
Nagashima et al.

(10) Patent No.: US 7,674,866 B2
(45) Date of Patent: Mar. 9, 2010

(54) METHOD OF PRODUCING POLYMER USING IRON COMPLEX AS CATALYST

(75) Inventors: Hideo Nagashima, Kasuga (JP); Shota Niibayashi, Kasuga (JP); Ren-Hua Jin, Tokyo (JP); Hitoshi Hayakawa, Yachiyo (JP)

(73) Assignees: Kyushu University, National University Corporation, Tokyo (JP); Dainippon Ink and Chemicals, Inc., Tokyo (JP)

( * ) Notice: Subject to any disclaimer, the term of this patent is extended or adjusted under 35 U.S.C. 154(b) by 33 days.

(21) Appl. No.: 12/066,706

(22) PCT Filed: Sep. 12, 2006

(86) PCT No.: PCT/JP2006/318083
§ 371 (c)(1),
(2), (4) Date: Mar. 13, 2008

(87) PCT Pub. No.: WO2007/032358
PCT Pub. Date: Mar. 22, 2007

(65) Prior Publication Data
US 2009/0118448 A1    May 7, 2009

(30) Foreign Application Priority Data
Sep. 14, 2005    (JP) .............................. 2005-267584

(51) Int. Cl.
*C07F 4/06* (2006.01)
*C08F 4/80* (2006.01)

(52) U.S. Cl. ........................................ 526/135; 526/171
(58) Field of Classification Search ................. 526/135
See application file for complete search history.

(56) References Cited

U.S. PATENT DOCUMENTS

| | | | |
|---|---|---|---|
| 6,538,091 B1 | 3/2003 | Matyjaszewski et al. | |
| 6,630,551 B1 * | 10/2003 | Okuda et al. ................ | 526/161 |
| 2004/0167301 A1 | 8/2004 | Nakagawa | |
| 2004/0171779 A1 | 9/2004 | Matyjaszewski et al. | |

FOREIGN PATENT DOCUMENTS

| | | |
|---|---|---|
| JP | 08-04117 A | 2/1996 |
| JP | 11-116606 A | 4/1999 |
| JP | 2946497 B2 | 7/1999 |
| JP | 2001-514697 A | 9/2001 |
| JP | 2002-080523 A | 3/2002 |
| JP | 2002-540234 A | 11/2002 |
| JP | 2002-356510 A | 12/2002 |
| JP | 2005-105265 A | 4/2005 |
| JP | 2006-257293 A | 9/2006 |

OTHER PUBLICATIONS

"Controller/"Living" Radical Polymerization. Halogen Atom Transfer Radical Polymerization Promoted by a Cu(I)/Cu(II) Redox Process" by Wang et al., Macromolecules 1995, 28, pp. 7901-7910, 1995 American Chemical Society.
"Initiating Systems for Nitroxide-Mediated "Living" Free Radical Polymerizations: Synthesis and Evaluation" by Hawker et al., pp. 5245-5254, Macromolecules, vol. 29, No. 16, Jul. 29, 1996.
"Living Free-Radical Polymerization by Reversible Addition-Fragmentation Chain Transfer: The RAFT Process" by Chiefari et al., Macromolecules 1998, 31, pp. 5559-5562, 1998 American Chemical Society.
"Atom Transfer Radical Polymerization" by Matyjaszewski et al., Chem. Rev. 2001, 101, pp. 2921-2990, 2001 American Chemical Society.
"Evolution of Iron Complexes: Development of Living Radical Polymerization via Ligand Design" by Uchiike et al., p. 136, 1Pb022, Polymer Preprints, Japan, vol. 54, No. 1 (2005).
"Controlled/"Living" Radical Polymerization of Styrene and Methyl Methacrylate Catalyzed by Iron Complexes1" by Matyjaszewski et al., Macromolecules 1997, 30, pp. 8161-8164, 1997 American Chemical Society.
"Iron(II) Chloride Complex for Living Radical Polymerization of Methyl Methacrylate1" by Ando et al., pp. 4507-4510, Macromolecules, vol. 30, No. 16, Aug. 11, 1997, American Chemical Society.
"Reverse Atom Transfer Radical Polymerization of Methyl Methacrylate with a New Catalytic System, FeCl3/ Isophthalic Acid" by Zhu et al., Journal of Polymer Science: Part A: Polymer Chemistry, vol. 39, pp. 765-774 (2001).
"Halide Anions as Ligands i nlron-Mediated Atom Transfer Radical Polymerization" by Teodorescu et al., Macromolecules 2000, 33, pp. 2335-2339, 2000 American Chemical Society.

* cited by examiner

*Primary Examiner*—Ling-Siu Choi
*Assistant Examiner*—Sonya Wright
(74) *Attorney, Agent, or Firm*—Darby & Darby, P.C.

(57) ABSTRACT

The object of the present invention is to provide a method of producing a polymer wherein radical-polymerizable monomers can be polymerized in a quantitative manner in a relatively short time, and a polymer or a block copolymer having at its termini a functional group that can be chemically converted while the polymer or the block copolymer has a high molecular weight can be produced. Furthermore, the object of the present invention is to provide a method of producing a polymer wherein the polymer is re-precipitated in a general solvent by an easy method, and the used iron complexes are recovered in the solvent, thereby recycling the iron complexes.

12 Claims, 4 Drawing Sheets

FIG. 1

GPC retention time (min.)

FIG. 2

GPC retention time (min.)

GPC retention time(min.)

FIG. 5

GPC retention time(min.)

FIG. 6

GPC retention time(min.)

METHOD OF PRODUCING POLYMER USING IRON COMPLEX AS CATALYST

CROSS-REFERENCE TO PRIOR APPLICATION

This is a U.S. National Phase Application under 35 U.S.C. §371 of International Patent Application No. PCT/JP2006/318083 filed Sep. 12, 2006, and claims the benefit of Japanese Patent Application No. 2005-267584, filed Sep. 14, 2005, both of which are incorporated by reference herein. The International Application was published in Japanese on Mar. 22, 2007 as WO 2007/032358 A1 under PCT Article 21(2).

TECHNICAL FIELD

The present invention relates to a method of producing a polymer, including polymerizing a radical-polymerizable monomer in the presence of a triazacyclononane iron complex and a radical generator. More specifically, the present invention relates to a method of producing a polymer having a terminal functional group that enables chemical conversion of the produced polymer, wherein a specific iron catalyst system that is applicable to a broad range of types of the radical-polymerizable monomers or combination thereof is utilized, and the molecular weight and molecular structure is controlled, and also relates to a method of producing a polymer wherein the iron complexes used in the polymerization is recovered and further recycled for a polymerization reaction.

BACKGROUND ART

A living radical polymerization wherein growing termini of the polymer have an activity that enable their chemical conversion [for example, atom transfer radical polymerization (ATRP) (see Non-patent Document 1); nitroxide-mediated polymerization (NMP) (See Non-patent Document 2); or reversible addition-fragmentation chain transfer polymerization (RAFT) wherein a sulfur compound is mediated (See Non-patent Document 3)] has attracted a great deal of attention over the last decade because, in such a method, the molecular weight of the polymer, order of monomer residues, the multidimensional structure, etc. could be freely controlled as it was different from a conventional radical polymerization In particular, it has been demonstrated that an atom transfer radical polymerization system wherein a metal complex is combined with a halogen compound is applicable to a wide range of monomer types, and a method of precisely controlling a monomer using such a system has also been applied to chemical modifications of a surface or boundary of a substrate, or device construction other than polymer synthesis.

With regard to metal catalysts used in the ATRP method, their central metal is generally copper or ruthenium. Such catalysts do not have a clear structure of a metal complex, and a metal ion and a compound that functions as its ligand (for example, amines) are often mixed into a polymerization reaction system to form such catalysts. In such a polymerization system, the catalytic activity of the metal is exhibited after the metal bonds to the ligand in the system, thereby forming a complex. When the ligands and the metal ions are used by mixing them into the polymerization reaction system, not all metals can form complexes. The metals that do not form a complex cannot show catalytic activity. Accordingly, the catalytic efficiency of the metal will be lowered. This brings about disadvantages wherein it may be required to increase the metal concentration or such a low activity may be insufficient for production of a high-molecular-weight polymer. Furthermore, the increase of the metal concentration will present a further a burden in requiring a step of removing the metal after the polymerization reaction, and may also raise a problem of environmental pollution due to the toxicity of metals. Additionally, it is also required to use an excessive amount of amine ligands, among others (see Patent Document 1 and 2). Many problems such as difficulty in controlling the reaction if the type of monomer is changed in the polymerization reaction; or inclusion of compounds other than monomers making polymer purification complex, have been mentioned when an excessive amount of amine ligands is used.

In general, an active halogen organic compound is used as a polymerization initiator in the ATRP method. In addition, when a polymerization is conducted where the active halogen organic compound is substituted with a conventional radical generator (for example, a peroxide-radical generator, or an azo-based radical generator) in the ATRP method, such a method is called "reverse-type ATRP" (R-ATRP). According to the R-ATRP method, a metal catalyst is added in a conventional radical polymerization process whereby reactive residues can be incorporated in termini of the polymerized products, and synthesis of a block copolymer can be achieved using such residues. Thus, the R-ATRP method can produce a polymer whose structure is controlled in the existing production process without using a halogen initiator, and therefore, this method is useful. In the R-ATRP method, many techniques wherein a copper ion complex formed basically using an amine as a ligand is used are known. Consequently, the R-ATRP also has the same problems as in the ATRP method such as the requirement of increasing the metal ion concentration or the ligand concentration, a decrease in the catalytic efficiency, complexity of the polymer purification, or polymer coloration.

In a living radical polymerization using a metal complex, the production of a polymer using a safe and cost-effective iron catalyst has attracted much attention in terms of environmental protection (Non-patent Document 4).

In the ATRP method, a polymer production technique wherein an iron ion and a ligand (for example, amines, phosphine compounds, or phosphite esters) are mixed with a polymerizable monomer to conduct a polymerization; or a polymer production technique wherein a synthesized iron complex and a polymerizable monomer are mixed to produce a polymer has been disclosed (see Non-patent Document 5: Sawamoto et al, proceedings for the 53th polymer symposium 2004, 2B16 on page 2456). For example, a method of polymerizing a methyl methacrylate wherein a bivalent iron ion and an amine-based ligand are mixed with a monomer, and a halogen initiator is used (see Non-patent Document 6); or a method of polymerizing methyl methacrylate wherein an iron complex formed using a bivalent iron ion and a phosphorus compound as a ligand, and a halogen initiator are used (for example, see Non-patent Document 7 or Patent Document 3) has been reported. However, in ATRP methods using such iron catalytic systems, a high-molecular-weight polymer, whose molecular weight reaches one hundred thousand units, is rarely synthesized. Additionally, in such methods, the iron complexes cannot be recovered and recycled for the polymerization reaction.

In the R-ATRP, use of an environmentally-friendly iron ion compound as a catalyst has been studied. For example, polymerization of methyl methacrylate using a complex of $FeCl_3$ and isophthalic acid as a catalyst has been reported (see Non-patent Document 8). In this system, a polymer having a molecular weight of up to about fifty thousand could be obtained. However, it is required to use N,N-dimethylformamide, which is strongly suspected of having carcinogenicity, as a reaction solvent. Moreover, polymerization of methacrylate or styrene wherein an iron complex formed with an organic onium cation and an anionic iron chloride-based compound is used as a catalyst has been reported (see Non-Patent Document 9). However, the R-ATRP radical polymerization using such an iron complex or iron compound has many problems to be solved (for example, the molecular weight of the polymer stays at twenty or thirty thousand units, or it is difficult to control a block copolymer).

On the other hand, in the living radical polymerization system using a metal catalyst, removal of metals from the polymer after polymerization has been considered as a key issue. In a sense, removal of the remaining metals from the polymer is a real issue to achieve practical use of the living radical polymerization rather than the polymerization reaction thereof. To remove the metals, for example, a method utilizing a complexing agent in a polymer-purification step has been studied (see Patent Document 4 or 5). The use of environmentally-friendly iron ion compounds as catalysts is highly advantageous in the entire process of the polymer production including a step such as an additional treatment because they are nontoxic, compared to the other metal ions such as copper, cobalt and ruthenium. However, the living radical polymerization using an iron ion has a disadvantage such as low polymerization efficiency, compared to a copper ion complex system. Furthermore, disadvantages in the production process such as instability of the ion catalyst or difficulty in recycling the iron catalyst have been mentioned.

With regard to the living radical polymerization reaction, the development of a polymer production method wherein iron complexes having a higher catalytic activity are used to conduct the polymerization reaction, and the iron complexes are removed from the polymerization reaction system, and recovered by an easy method without disposing of them, thereby recycling them as polymerization reaction catalysts is considered to be a very important issue from a viewpoint of industry.

Patent Document 1: Japanese Unexamined Patent Publication No. H8-41117

Patent Document 2: Japanese Unexamined Patent Publication No. 2002-80523

Patent Document 3: Japanese Patent No. 2,946,497

Patent Document 4: Japanese Unexamined Patent Publication No. 2002-356510

Patent Document 5: Japanese Unexamined Patent Publication No. 2005-105265

Non-patent Document 1: J. Wang et al. 1995. Macromolecules 28, page 7901

Non-patent Document 2: C. J. Hawker et al. 1996. Macromolecules 29, page 5245

Non-patent Document 3: J. Chiefari et al. 1998. Macromolecules 31, page 5559

Non-patent Document 4: Matyjaszewski et al. 2001. Chem. Rev. 101, page 2921

Non-patent Document 5: Sawamoto et al., Proceedings for the 53th polymer symposium 2004, 1Pb022 on page 136

Non-patent Document 6: Matyjaszewski et al. 1997. Macromolecules 30, page 8161

Non-patent Document 7: Ando et al. 1997. Macromolecules 30, page 4507

Non-patent Document 8: Zhu et al. 2001. J. Polym. Sci. Part A: Polym. Chem. 39, page 765

Non-patent Document 9: M. Teodorescu et al. 2000. Macromolecules 33, page 2335

DISCLOSURE OF THE INVENTION

The problem to be solved by the present invention is to provide a method of producing a polymer wherein radical-polymerizable monomers can be polymerized in a quantitative manner in a relatively short time, and a polymer or a block copolymer having at its termini a functional group that is chemically converted can be produced while the polymer or the block copolymer has a high molecular weight. Furthermore, the problem to be solved by the present invention is to provide a method of producing a polymer wherein the polymer is reprecipitated in a general solvent by an easy method, and the used iron complexes are recovered in the solvent, thereby recycling the iron complexes.

In the present invention, a specific iron complex with a triazacyclononane was focused on as a metal complex having catalytic activity, and this resulted in the present invention.

Specifically, an aspect of the present invention is to provide a method of producing a polymer, including: polymerizing at least one type of a radical-polymerizable monomer in the presence of a radical-polymerization initiator by using as a polymerization catalyst at least one iron complex selected from the group consisting of iron complexes represented by general formulas (1) to (7):

(wherein any one of Fe is a bivalent cation; $X_1$ represents $Cl^-$, $Br^-$ or $I^-$; $X_2$ represents $Cl^-$, $Br^-$, $CN^-$ or $S^-$—Ph where Ph represents a phenyl group; and R represents a methyl group or an ethyl group);

(wherein any one of Fe is a bivalent cation; $X_3$ represents $Cl^-$, $Br^-$ or $I^-$; R represents a methyl group or an ethyl group; and $A^-$ represents an anion);

(3)

(wherein Fe is a bivalent cation; $X_4$ represents $Cl^-$, $Br^-$, $CN^-$, $S^-$—Ph or $S^-$—$R_1$ where Ph represents a phenyl group and $R_1$ represents a methyl group or an ethyl group; $L_1$ represents $CH_3CN$ or CO; $R_1$ represents a methyl group or an ethyl group; and $A^-$ represents an anion);

(4)

(wherein Fe is a bivalent cation; $X_5$ represents $Cl^-$, $Br^-$, $CN^-$, $S^-$—Ph or $S^-$—$R_1$ where Ph represents a phenyl group and $R_1$ represents a methyl group or an ethyl group; $D^+$ represents a cation; and R represents a methyl group or an ethyl group);

(5)

(wherein Fe is a bivalent cation; $X_6$ represents $Cl^-$, $Br^-$, $CN^-$, $S^-$—Ph or $S^-$—$R_1$ where Ph represents a phenyl group and $R_1$ represents a methyl group or an ethyl group; $L_2$ represents $CH_3CN$ or CO; and R represents a methyl group or an ethyl group);

(6)

(wherein Fe is a tervalent cation; $X_7$ represents $Cl^-$, $Br^-$ or $I^-$; and R represents a methyl group or an ethyl group); and (7)

(wherein any one of Fe is a tervalent cation; $X_8$ represents $Cl^-$, $Br^-$ or $I^-$; and R represents a methyl group or an ethyl group).

In the present invention, the above-described iron complexes and a radical generator are used. Therefore, since it is not required to use the other ligands, the polymerization reaction can be very simplified, and the radical polymerization reaction can be promoted in a quantitative manner due to the excellent catalytic activity of the iron complex. Moreover, the produced polymer has active termini that cannot be obtained by general radical polymerization. Accordingly, by adding the other radical-polymerizable monomers thereto after the quantitative polymerization, a block copolymer can be easily produced. Furthermore, the iron complexes can be efficiently dissolved in a solvent phase in the simple process of reprecipitating the polymer after the polymerization reaction is completed whereby the iron complexes can be easily recovered and recycled as catalysts. That is, the above-described iron complex is used in the conventional radical polymerization system in the present invention. Accordingly, the present invention not only brings about many advantages in controlling a polymerization reaction in an industrial process, but can also achieve higher efficiency of the industrial process and resource saving at the same time.

Additionally, as effects of the present invention, the use of the iron complex prevents environmental pollution, compared to metal ion systems using toxic metals such as a copper complex, and can also simplify a post-treatment process for the produced polymer.

BEST MODE FOR CARRYING OUT THE INVENTION

In the present invention, an iron complex (Y), wherein a triazacyclononane group having a methyl group or an ethyl group bonded to its nitrogen atom is coordinated to an iron, and a halogen, cyano, or thiolate is included, is used as a metal complex being a polymerization catalyst, and the iron complex (Y) is combined with a polymerization initiator whereby polymerization of radial polymerizable monomers can be promoted in the living radical polymerization-type ATRP or R-ATRP, and the polymerization thereof can be promoted in a quantitative manner. Furthermore, a polymer having a chemically convertible functional residue bonded to its termini can be provided.

As a structure of the iron complex (Y) used in the present invention, for example, an iron complex having a structure represented by general formula (1) can be mentioned. Using the iron complex having such a structure, radical-polymerizable monomers can be polymerized in a quantitative manner, thereby producing an ATRP-type polymer.

(wherein any one of Fe is a bivalent cation; $X_3$ represents $Cl^-$, $Br^-$ or $I^-$; R represents a methyl group or an ethyl group; and $A^-$ represents an anion.)

(wherein Fe is a bivalent cation; $X_4$ represents $Cl^-$, $Br^-$, $CN^-$, $S^-$—Ph or $S^-$—$R_1$ where Ph represents a phenyl group and $R_1$ represents a methyl group or an ethyl group; $L_1$ represents $CH_3CN$ or CO; $R_1$ represents a methyl group or an ethyl group; and $A^-$ represents an anion.)

The above-described cation-type iron complex represented by general formula (2) or (3) has a structural feature wherein a triazacyclononane chelate having an alkyl group bonded to its nitrogen atom is coordinated to a bivalent iron ion, and at least one halogen ion, cyanide ion, phenylthiolate ion ($S^-$—Ph), methylthiolate ion ($S^-$—$CH_3$), or ethylthiolate group ($S^-$—$C_2H_5$) is bonded in the complex thereof.

(wherein any one of Fe is a bivalent cation; $X_1$ represents $Cl^-$, $Br^-$ or $I^-$; $X_2$ represents $Cl^-$, $Br^-$, $CN^-$ or $S^-$—Ph where Ph represents a phenyl group; and R represents a methyl group or an ethyl group.)

The above-mentioned iron complex represented by general formula (1) includes a cation wherein triazacyclononane chelates having an alkyl group bonded to the nitrogen atom are coordinated to bivalent iron ions ($Fe^{2+}$), and at least one halogen is bonded in the complex thereof; and an anion wherein a triazacyclononane chelate having an alkyl group bonded to its nitrogen atoms is coordinated to a bivalent iron ion.

In the cation in general formula (1), the halogen ions linking the cationic iron ions may be any one of $Cl^-$, $Br^-$ and $I^-$. It is preferable that the halogen ion be $Cl^-$ or $Br^-$ in terms of its long-term stability of the catalytic activity. Additionally, the alkyl group bonded to the nitrogen atom is a methyl group or an ethyl group.

For example, $Cl^-$ or $Br^-$ can be used as the halogen ions bonded to the cationic iron ion in the anion complex in the above general formula (1). $Cl^-$ or $Br^-$ is preferable in terms of its long-term stability of the catalytic activity. Furthermore, the halogen ions may be $CN^-$ or $S^-$—Ph, bonded to the iron. Additionally, the alkyl group bonded to the nitrogen atom is a methyl group or an ethyl group.

Moreover, a cation-type dinuclear- or mononuclear-iron complex having a structure represented by general formula (2) or (3) can be used as the iron complex (Y). Using the iron complex having such a structure, radical-polymerizable monomers can be polymerized in a quantitative manner, thereby producing an ATRP-type polymer.

In the cation-type iron complex represented by general formula (2), the halogen ions linking the irons may be any one of $Cl^-$, $Br^-$ and $I^-$. It is preferable that the halogen ion be $Cl^-$ or $Br^-$ in terms of its long-term stability of the catalytic activity. Additionally, the alkyl group bonded to the nitrogen atom is a methyl group or an ethyl group.

For example, $Cl^-$, $Br^-$ or $I^-$ can be used as the ion bonded to the iron in the anion complex represented by general formula (3). Furthermore, a cyanide ion, phenylthiolate ion, methylthiolate ion, or ethylthiolate ion may also be used as the ion bonded to the iron. $Cl^-$ or $Br^-$ is preferable in terms of its long-term stability of the catalytic activity. Additionally, the alkyl group bonded to the nitrogen atom is a methyl group or an ethyl group.

Other than the above-described ions, $CH_3CN$ or CO is bonded to the iron in the cation-type iron complex represented by general formula (3).

Because the above-described iron complex represented by general formula (2) or (3) is charged as a monovalent cation, the iron complex can match a monovalent counter anion. The counter anion may be a complex-type anion including the same metal ion as in the anion present in the above general formula (1), or may be a general inorganic anion or organic anion. For example, a trichloride-type or tribromide-type anionic iron complex wherein a bivalent iron ion is coordinated to a chelate ligand can be used. In addition, the monovalent counter anion $A^-$ can be an inorganic anion such as $PF_6^-$, $SbF_6^-$, $BF_4^-$, $BrO_3^-$, $NO_3^-$, $Cl^-$, $Br^-$ or $F^-$. As the organic anion, the monovalent counter anion A⁻ may be an aliphatic or aromatic counter anion such as $CF_3COO^-$, $CH_3COO^-$, Ph—COO⁻, a long chain alkyl sulfonate anion, or a long chain alkyl carboxylate anion.

Furthermore, in the present invention, an anion-type mononuclear iron complex having a structure represented by general formula (4) can be used as the iron complex (Y). Using the iron complex having such a structure, radical-polymerizable monomers can be polymerized in a quantitative manner, thereby producing an ATRP-type polymer.

(4)

(wherein Fe is a bivalent cation; $X_5$ represents Cl⁻, Br⁻, CN⁻, S⁻—Ph or S⁻—$R_1$ where Ph represents a phenyl group and $R_1$ represents a methyl group or an ethyl group; D⁺ represents a cation; and R represents a methyl group or an ethyl group.)

With regard to structural features of the iron complex represented by general formula (4), a triazacyclononane chelate having an alkyl group bonded to its nitrogen atoms is coordinated to a bivalent iron ion. The halogen ion bonded to the iron may be Cl⁻, Br⁻ or I⁻. It is preferable that the halogen ion be a chloride ion or bromide ion in terms of its long-term stability of the catalytic activity. Furthermore, the halogen ion may also be a cyanide ion bonded to the iron ion, a phenyl group (Ph)-bound sulfur ion, or a methyl group- or ethyl group-bound sulfur ion. Additionally, the alkyl group bonded to the nitrogen atom is a methyl group or an ethyl group.

In general formula (4), D⁺ is a monovalent cation. The cation may be an organic onium ion such as ammonium, phosphonium or sulfonium, or a monovalent cation such as an alkali metal ion. It is preferable that the cation be a cationic complex or an organic onium cation including a bivalent iron. For example, tetraethylammonium, tetrabutylammonium, tetraphenylammonium, trimethyloctylammonium, trimethyldodecylammonium, tetraethylphosphonium, tetrabutylphosphonium, tetraphenylphosphonium, or triphenylsulfonium is preferable.

In the present invention, an iron complex having a structure represented by general formula (5) can be also used as the iron complex (Y). Using the iron complex having such a structure, radical-polymerizable monomers can be polymerized in a quantitative manner, thereby producing an ATRP-type polymer.

(5)

(wherein Fe is a bivalent cation; $X_6$ represents Cl⁻, Br⁻, CN⁻, S⁻—Ph or S⁻—$R_1$ where Ph represents a phenyl group and $R_1$ represents a methyl group or an ethyl group; $L_2$ represents $CH_3CN$ or CO; and R represents a methyl group or an ethyl group.)

With regard to structural features of the iron complex represented by general formula (5), a triazacyclononane chelate having an alkyl group bonded to its nitrogen atom is coordinated to a bivalent iron ion. The halogen ion bonded to the iron ion may be Cl⁻, Br⁻ or I⁻. It is preferable that the halogen ion be a chloride ion or bromide ion in terms of its long-term stability of the catalytic activity. A cyanide ion, phenylthiolate ion, methylthiolate ion, or ethylthiolate ion may also be bonded to the iron ion as the halogen ion. Furthermore, as the ligand bonded to the iron, an acetonitrile or carbon monoxide may be acceptable. Additionally, the alkyl group bonded to the nitrogen atom is a methyl group or an ethyl group.

When the above-described catalysts represented by the above general formulas (1) to (5) are used to conduct the polymerization reaction of the radical-polymerizable monomers, the radical polymerization initiator (Z) used in the polymerization reaction may be preferably an active halogen compound. It is preferable that the initiator be, for example, an α-halogenocarbonyl compound, α-halogenocarboxylic acid ester compound, halogen methylarene active methylene compound, or polyhalogenated alkane compound. More specifically, a carbonyl compound such as 1,1-dichloroacetophenone, 1,1-dichloroacetone, 1,1-dibromoacetophenone, or 1,1-dibromoacetone; esters such as ethyl 2-bromo-2-methylpropanoate, 9-anthracenemethyl-2-bromo-isobutylate, dimethyl 2-chloro-2,4,4-trimethylglutarate, or 1,2-bis(α-bromopropionyloxy)ethane; a active methylene (methine)-type arene such as chloromethylbenzene, bromomethylbenzene, iodomethylbenzene, dichloromethylbenzene, dibromomethylbenzene, 1-phenylethyl chloride, or 1-phenylethyl bromide; or a polyhalogen compound such as carbon tetrachloride or carbon tetrabromide can be mentioned.

If a polymerization initiator having three or more active sites is used as the radical polymerization initiator (Z), a star polymer can be easily synthesized. For example, an active methylene-type halogen methylarene compound such as 1,3,5-tri(chloromethyl)benzene, 1,3,5-tri(bromomethyl)benzene, 1,2,4,5-tetra(chloromethyl)benzene, 1,2,4,5-tetra(bromomethyl)benzene, 1,2,3,4,5,6-hexa(chloromethyl)benzene, or 1,2,3,4,5,6-hexa(bromomethyl)benzene can be mentioned.

In addition, a polymer having the above-described active halogen compound residue in its termini or side-chains can be used as the polymerization initiator. The examples thereof include polymers of polymethacrylates, polyacrylates, polyacrylamides, polystyrenes, polyvinylpyridines, polyethylene glycols, or polyethers where the polymers thereof have the above-described active halogen compound residues at one or both termini. With regard to the active halogen compound residues, for example, a polymer wherein an α-halogenocarbonyl group, or an α-halogenocarboxylic acid ester residue is bound can be preferably used. In addition, a polymer having hydroxyl groups in side chains (such as epoxy resins, polyvinyl alcohols, or polysaccharide polymers) wherein an active halogen compound residue (for example, an α-halogenocarboxylic acid group) is bonded to the hydroxyl groups can also be mentioned. If such polymers are used as the polymerization initiator, a block polymer or a comb polymer can be easily obtained.

When the above-described iron complexes represented by general formulas (1) to (5) are combined with the active halogen compounds, these can be used where a molar ratio of complex/active halogen compound is within a range of 1 to 0.5. However, it is preferable that the amount of the active halogen compound be excessive to the complex in terms of higher iron-catalytic activity.

The ATRP polymerization system using the iron complex (Y) according to the present invention can be applied to all radical-polymerizable monomers. Examples of the polymerizable monomers include (meth)acrylates, (meth)acrylamides, styrenes, or vinylpyridines. More specifically, methacrylate monomers such as a methyl methacrylate, ethyl methacrylate, butyl methacrylate, t-butyl methacrylate, hexyl methacrylate, cyclohexyl methacrylate, benzyl methacrylate, 2-hydroxyethyl methacrylate, or 2-dimethylaminoethyl methacrylate; acrylate monomers such as methyl acrylate, ethyl acrylate, butyl acrylate, t-butyl acrylate, hexyl acrylate, cyclohexyl acrylate, benzyl acrylate, 2-hydroxyethyl acrylate, or 2-dimethylaminoethyl acrylate; acrylamide monomers such as N,N-dimethylacrylamide, N,N-diethylacrylamide, or N-isopropylacrylamide; styrene monomers such as styrene, 2-chloromethylstyrene, 3-chloromethylstyrene, 4-chloromethylstyrene, p-methoxystyrene, p-vinylbenzoic acid, or p-vinylphenylsulfonic acid; or vinylpyridine monomers such as p-vinylpyridine, or o-vinylpyridine can be used.

These monomers can be used singularly or in combination of two or more types thereof at the same time. Furthermore, two or more types of monomers can be added at regular intervals in the polymerization reaction. After the first monomers are consumed, the next monomers are added. Accordingly, the obtained polymer can be formed into a structure of a di-block, tri-block or multi-block copolymer.

If the polymerizable monomers are selected from the styrene-based monomers and (meth)acrylate-based monomers in the synthesis of the block copolymer, a block copolymer including polymer backbones of two monomers thereof can be obtained. Moreover, by using a hydrophilic monomer and a hydrophobic monomer, an amphipathic block copolymer including a hydrophilic polymer backbone and a hydrophobic polymer backbone can be obtained.

Additionally, as a method of producing a block copolymer, a polymer having an active halogen residue at its termini is used as an initiator, thereby polymerizing polymerizable monomers.

If a basic monomer is used as the polymerizable monomer to produce a block copolymer, a block copolymer including a basic polymer backbone and the other polymer backbone can be obtained.

When polymerizable monomers are mixed with the polymerization initiator (Z) to conduct the polymerization, a molar ratio of polymerizable monomer/active halogen compound may be within a range of 10 to 10000. In order to more reliably control the polymerization degree, it is more preferable that the molar ratio be within a range of 50 to 1000.

When a polymerization reaction is conducted using the polymerization initiator system according to the present invention, the reaction temperature can be set to room temperature or more. However, it is preferable that the reaction be conducted within a range of 30° C. to 120° C.

It may be sufficient that the reaction time be within a range of 1 to 48 hours. However, the reaction time can be set to longer or shorter depending on a type of initiator, a type of olefin monomer and the reaction temperature. Furthermore, it is preferable that the reaction time be determined depending on control of the molecular weight of the produced copolymer.

Different types of polymerization methods such as the bulk polymerization without using a solvent, the solution polymerization in the presence of a solvent, or a polymerization in an alcohol solvent or an aqueous medium can be applied to the copolymerization reaction of the present invention.

Examples of solvents applicable to the polymerization reaction of the present invention include dichloromethane, 1,2-dichloroethane, tetrahydrofuran, acetonitrile, benzene, toluene, chlorobenzene, dichlorobenzene, anisole, cyanobenzen, dimethylformamide, N,N-dimethylacetamide, methyl ethyl ketone, methanol, ethanol, propanol, butanol, pentanol, or hexanol.

With regard to the polymerization in an aqueous medium, an organic solvent that can be mixed with water at a certain ratio is preferable. For example, methanol, ethanol, acetone, acetonitrile, dimethylacetamide, dimethylformamide, or tetrahydrofuran can be mentioned.

Moreover, polymerization of water-soluble monomers can be conducted only in water. Furthermore, hydrophobic monomers can be dispersed in water to conduct the polymerization.

Among the bivalent iron complexes represented by general formulas (1) to (5), particularly, ionic iron complexes are soluble in a solvent that does not dissolve a hydrophobic polymer (for example, methanol or water). Accordingly, in the polymerization system using a dinuclear iron complex, after the polymerization is completed, the obtained mixture is subjected to precipitation in a medium such as methanol, an alcohol, or water. Consequently, iron complexes in the mixture are dissolved in the polar solvent while the polymer is precipitated. Based on such a simple method, the dinuclear iron complexes can be recovered and concentrated whereby the complexes can be recycled as a polymerization catalyst.

In recovering the complexes, the complexes can be reliably recovered by using poor solvents for the polymer (for example, methanol, ethanol, or water) without using the other complexing agents.

The recovered mixture is concentrated, and washed in methanol, ethanol or water whereby only soluble complexes can be recovered and purified.

In the present invention, when an iron complex having a structure represented by general formula (6) or (7) is used as the iron complex (Y), radical-polymerizable monomers can be polymerized in a quantitative manner, thereby producing an R-ATRP-type polymer.

(6)

(wherein Fe is a tervalent cation; $X_7$ represents $Cl^-$, $Br^-$ or $I^-$; and R represents a methyl group or an ethyl group.)

(7)

(wherein any one of Fe is a tervalent cation; $X_8$ represents $Cl^-$, $Br^-$ or I—; and R represents a methyl group or an ethyl group.)

An iron complex (Y) wherein a cyclic amine-based chelate ligand is coordinated to a trivalent iron ion, and halogen groups are present around the iron, as represented by general formula (6) or (7); and a radical generator as a polymerization initiator (Z) are used whereby the polymerization of radical-polymerizable monomers can be promoted in a quantitative manner by the R-ATRP method. Based on such a polymerization, a polymer whose termini can be chemically converted; a polymer obtained by using the purified polymer thereof as a macroinitiator; a polymer obtained by adding monomers stepwise; or a polymer such as block copolymer whose structure is controlled can be obtained.

Particularly, as a key feature in use of the complex, an organic compound having a cyano group is combined with the iron complex (Y) and a radical generator whereby the molecular weight distribution represented by Mw/Mn (Mn refers to weight average molecular weight; and Mw refers to number average molecular weight) of a polymer obtained from radical-polymerizable monomers will be within a range of 1.1 to 1.4, and the polymer whose number average molecular weight is 10000 to 200000 can be easily obtained. Halogen atoms are bound to the termini of the polymer obtained by this method. Therefore, the polymer can be used as a macroinitiator in the ATRP polymerization. Furthermore, the termini can be converted to the other compound residues.

Additionally, when the iron complex represented by general formula (6) or (7) is used, the complex can be recovered and purified after polymerization, thereby recycling the complex as a polymerization catalyst.

The iron complexes represented by general formulas (6) and (7) of the present invention can be reliably used to polymerize any radical-polymerizable monomers such as (meth)acrylates, styrenes, acrylamides, or pyridines. In the R-ATRP polymerization method using the iron complexes, a high-molecular-weight polymer or block copolymer can be easily provided.

In general formula (6), besides cyclic amine ligands, three of $X_7$ may be a halogen ion, i.e. $Cl^-$, $Br^-$ or $I^-$. It is preferable that the halogen ion be $Cl^-$ or $Br^-$ in terms of its long-term stability of the catalytic activity. In general formula (7), all of $X_8$ are a halogen ion, and R is a methyl group or an ethyl group. The iron complex thereof can be used as the polymerization catalyst.

Any radical generators that can be generally used in a radical polymerization of vinyl-based monomers can be used in the polymerization reaction using the iron complexes represented by general formulas (6) and (7) in the present invention. Typical examples of such radical generators include an organic peroxide, including a peroxyester such as t-butylperoxy(2-ethylhexanoate) or t-butylperoxybenzoate, a dialkyl peroxide such as di-t-butyl peroxide, or dicumyl peroxide, or a peroxyketal such as 1,1-bis(t-butylperoxy)-3,3,5-trimethylcyclohexane); or an azo-based compound such as azobisisobutylonitrile, azobiscyclohexanecarbonitrile, or 2,2'-azobis(2,4-dimethylvaleronitrile).

Furthermore, a soluble peroxide or a soluble azo compound can also be used as the radical generator. For example, a peroxide such as hydroxy-t-butyl peroxide, ammonium persulfate, potassium persulfate, or hydrogen peroxide; or an azo-based polymerization initiator "VA-046B", "VA-057", "VA-060", "VA-067", "VA-086", "VA-044", "V-50", "VA-061", or "VA-080" can be mentioned. In particular, if an azo-based water-soluble initiator is used, an effective functional group derived from the initiator residues can be incorporated to one terminus of the polymer.

The combination of the iron catalyst with the radical generator in the present invention can be applied to all general radical-polymerizable monomers. Examples of the polymerizable monomers include (meth)acrylates, (meth)acrylamides, styrenes, or vinylpyridines. More specifically, methacrylate monomers such as methyl methacrylate, ethyl methacrylate, butyl methacrylate, t-butyl methacrylate, hexyl methacrylate, cyclohexyl methacrylate, benzyl methacrylate, 2-hydroxyethyl methacrylate, 2-dimethylaminoethyl methacrylate; acrylate monomers such as methyl acrylate, ethyl acrylate, butyl acrylate, t-butyl acrylate, hexyl acrylate, cyclohexyl acrylate, benzyl acrylate, 2-hydroxyethyl acrylate, or 2-dimethylaminoethyl acrylate; acrylamide monomers such as N,N-dimethylacrylamide, N,N-diethylacrylamide, or N-isopropylacrylamide; styrene monomers such as styrene, 2-chloromethylstyrene, 3-chloromethylstyrene, 4-chloromethylstyrene, p-methoxystyrene, p-vinylbenzoic acid, or p-vinylphenylsulfonic acid; or vinylpyridine monomers such as p-vinylpyridine, or o-vinylpyridine can be used.

In the polymerization of the present invention according to general formulas (6) and (7), the above-described polymerizable monomer can be used singularly or in combination of two or more types thereof at the same time in the reaction. Additionally, two or more types of radical-polymerizable monomers can be added at regular intervals in the polymerization reaction. After the first radical-polymerizable monomers are consumed, the next radical-polymerizable monomers are added. Accordingly, the obtained polymer can be formed into a structure of a di-block, tri-block or multi-block copolymer.

If the polymerizable monomers are selected from the styrene-based monomers and (meth)acrylate-based monomers in the synthesis of the block copolymer, a block copolymer including polymer backbones of two monomers thereof can be obtained. In the same manner, a block copolymer of a styrene-based monomer combined with a vinylpyridine-based monomer; a block copolymer of a styrene-based monomer combined with an acrylamide-based monomer; or a block copolymer of a (meth)acrylate-based monomer combined with an acrylamide-based monomer can be obtained. Moreover, by using a hydrophilic monomer and a hydrophobic monomer, an amphipathic block copolymer including a hydrophilic polymer backbone and a hydrophobic polymer backbone can be obtained. Additionally, a dual-hydrophilic block copolymer can be obtained by polymerizing two types of hydrophilic monomers.

When the radical generator is mixed with the iron complexes represented by general formulas (6) and (7) to polymerize the above-described polymerizable monomers, 1 to 6 moles of the iron complex is preferably used to 1 mole of the radical generator. 1.5 to 3 moles of the complex is more preferably used.

Furthermore, if the molar ratio of radial polymerizable monomer to the radical generator is within a range of 50 to 8000 in the condition of the above preferable molar ratio of the iron complex to the radical generator, then, the polymerization can be reliably conducted. By modifying the molar ratio of the radical-polymerizable monomer to the radical generator, the number average molecular weight can be increased or decreased. In particular, to produce a polymer or block copolymer having a lager number average molecular weight, it is preferable that the number of moles of radical-polymerizable monomer be set to higher. In the present invention, a polymer or a block copolymer whose number average molecular weight is 200,000 or more can be easily synthesized.

When the above-described iron complexes represented by general formulas (6) and (7) are used to conduct the polymerization reaction in the present invention, the reaction can be conducted where the reaction temperature is set to room temperature or higher, or preferably 30° C. to 120° C.

The reaction time may be sufficient within a range of 1 to 48 hours. However, it is preferable that the reaction time be set depending on a type of the catalyst, a type of the radical-polymerizable monomer and the reaction temperature. Furthermore, it is preferable that the reaction time be adjusted depending on control of the molecular weight of the produced polymer.

When the above-described iron complexes represented by general formulas (6) and (7) are used to conduct the polymerization reaction in the present invention, an organic compound having a cyano group may be added to the polymerization reaction system. This is because the catalytic effect can be remarkably improved, thereby efficiently producing a polymer having a narrow molecular weight distribution. A cyanoalkane, or a cyanoarene can be used as the compound having a cyano group. For example, a cyano compound having a polyfunctional group can also be preferably used in addition to a general cyano compound such as acetonitrile, cyanopropane, cyanocyclohexane, cyanomethylbenzene or cyanobenzene.

When the above-described cyano compound is used, the compound may also be used as a reaction solvent. It is preferable that the amount of the cyano compound used therein be adjusted such that the moles of the cyano compound reach five-fold or higher of moles of the complex.

Different types of polymerization methods such as the bulk polymerization without using a solvent, the solution polymerization in the presence of a solvent, or a polymerization in an alcohol or an aqueous medium can be applied to the polymerization reaction of the present invention.

If priority is put to narrowing the molecular weight distribution of the produced polymer, the solution polymerization is preferred. Examples of solvents applicable to the polymerization reaction using the iron complexes represented by general formulas (6) and (7) according to the present invention include dichloromethane, 1,2-dichloroethane, tetrahydrofuran, acetonitrile, benzene, toluene, chlorobenzene, dichlorobenzene, anisole, cyanobenzene, dimethylformamide, N,N-dimethylacetamide, methyl ethyl ketone, acetone, methanol, ethanol, propanol, butanol, pentanol, or hexanol. In addition, the polymerization reaction can also be conducted in an aqueous medium wherein water and a water-soluble organic solvent are mixed. The polymer molecular weight distribution can be further controlled by adding the cyano compound thereto during the solution polymerization.

In the polymerization using the iron complexes represented by general formulas (6) and (7) according to the present invention, the reaction solution can be subjected to a process of precipitation in a medium such as alcohols, acetone, ethers, or water. Accordingly, only the polymer can be precipitated while the complexes can be dissolved in the medium. Consequently, the iron complexes are removed from the produced polymer, and the iron complexes in the medium can be concentrated and recovered. The recovered iron complexes can be recycled as the polymerization catalyst.

For the medium for recovering the catalyst, a single organic solvent may be preferably used, or a medium wherein an organic solvent is mixed with water can also be preferably used.

In the production method according to the present invention, the iron complexes represented by general formulas (1) to (7) are used whereby not only can environmental pollution be prevented, compared to the toxic metal ion-based system using a copper complex or the like, but the post-treatment process on the produced polymer can also be made simple.

Moreover, after the polymerization reaction is completed, the iron complexes represented by general formulas (1) to (7) can be efficiently dissolved in a solvent phase in the simple process of reprecipitating the polymer. Accordingly, the iron complexes can be easily recovered and recycled as a catalyst.

Furthermore, in the production method according to the present invention, it is not required to use the other ligands because the above-described iron complexes and the radical generator are used. Therefore, the polymerization reaction system thereof can be made very simple, and the radical polymerization reaction proceeds in a quantitative manner due to the excellent catalytic activity of the iron complex. Additionally, the produced polymer includes active termini that cannot be obtained by general radical polymerization. Consequently, by adding the other radical-polymerizable monomers thereto after the quantitative polymerization, a block copolymer can be easily produced.

The polymer or the block copolymer obtained using the production method according to the present invention as described above can be applied to wide range of uses such as inks, pigment-dispersing, color filters, films, coating paints, materials for molding, adhesives, materials for electric or electronic products, or medical materials.

EXAMPLES

Hereinafter, the present invention will be described in detail with reference to Examples and Comparative Examples.

The measurements in Examples were conducted based on the method described below.

(GPC Measurement Method)

The measurement was conducted based on high-performance liquid chromatography ("HLC-8020" produced by TOSOH CORPORATION) equipped with a UV & RI detector; and columns: "TSKgel 2000x1", "3000Hx1, "5000Hx1", and "Guardcolumn Hx1-H". The solvent was tetrahydrofuran (hereinafter, abbreviated as "THF"); the flow rate was 1.0 mL/min; and the temperature was controlled at 40° C. to conduct the measurement.

(NMR Measurement)

$^1$H and $^{13}$C NMR measurement was conducted using "Lambda 600" produced by JEOL Ltd.

(ICP Measurement Method)

A polymer powder obtained by precipitation after a polymerization reaction was treated in a microwave sample-pretreating machine ("MLS-1200 MEGA" produced by Milestone General Inc.). With respect to the solution thereof, the amount of the remaining iron was measured using an IPC analysis machine ("Optima 3300DV" produced by Perkin Elmer, Inc.).

(Synthesis Example of N,N,N-trimethylcycloazanonane (TACN))

24.3 g of $K_2CO_3$ anhydride and 600 mL of distilled water were charged to a 2 L three-necked flask. Then, 5.5 g of diethylene triamine and 31 g of p-toluenesulfonyl chloride were added thereto while vigorously stirring. This was further stirred for one hour while being incubated in an oil bath at 90° C. Then, 240 mL of xylene, 19.15 g of sodium hydroxide, 5.35 mL of a 1 M $Bu_4N^+OH^-$ aqueous solution, 8 mL of 1,2-dibromoethane were added thereto, and these were stirred for four hours at 90° C. Then, 8 mL of 1,2-dibromoethane was added thereto, and these were stirred for eight hours at 90° C. 8 mL of 1,2-dibromoethane was further added thereto, and the solution was further stirred for eighteen hours at 90° C. The solution was cooled to room temperature, and subjected to filtration. The obtained solid content was washed with water, and 25 g of Ts$_3$TACN (Ts: tosyl group) was obtained.

10.37 g of Ts$_3$TACN was charged to a 30 mL recovery flask, and the mixture of 10 mL of concentrated sulfuric acid and 2 mL of distilled water was added thereto. The container was incubated in an oil bath, and heated to 140° C. The solid content was dissolved therein by stirring, and a black solution was obtained. This was further stirred for six hours at 140° C. The obtained solution was slowly charged to a 500 mL two-necked flask in which 32 g of a 50% (w/w) sodium hydroxide aqueous solution and 13 g of distilled water were contained while ice-cooling. 23 mL of a 37% formaldehyde aqueous solution and 23 mL of 88% formic acid were added thereto, and this was heated to 90° C. Consequently, a gas (CO$_2$) was generated. After the generation of the gas ceased, the reaction container was cooled to 0° C., and 50 g of a 50% (w/w) sodium hydroxide aqueous solution was added thereto. 200 ml of hexane was added thereto, and this was stirred for two minutes. Then, the organic phase thereof was separated with a separating funnel. Furthermore, the aqueous phase thereof was subjected to hexane extraction, and the hexane phase was combined with the organic phase, and this was dried with sodium sulfate. Then, this was concentrated under reduced pressure, and the resulting Me$_3$TACN (Me: methyl group) was obtained (yield: 25%).

Synthesis Example 1

Synthesis of Iron Complex 1

0.317 g (2.50 mmol) of FeCl$_2$ and 20 mL of acetonitrile were charged to a 100 mL Schlenk flask, and this was suspended to obtain a reaction solution. Then, 0.50 mL (2.58 mmol) of Me$_3$TACN was added to the reaction solution, this was stirred for two hours, and the insoluble content was removed by filtration. The reaction solution was concentrated under reduced pressure until its volume was reduced to about 5 mL. After that, 50 mL of ether was stacked on the solution whereby a white solid content was precipitated. This solid content was recrystallized from the acetonitrile/ether, thereby obtaining 664 mg of an Iron complex 1 (yield: 89%).

Synthesis Example 2

Synthesis of Iron Complex 2

0.108 g (0.5 mmol) of FeBr$_2$ and 4 mL of acetonitrile were charged to a 20 mL Schlenk flask, and this was suspended to obtain a reaction solution. Then, an acetonitrile solution (2 mL) of Me$_3$TACN (0.1 mL; 0.51 mmol) was added to the reaction solution, this was stirred for one hour, and then, the insoluble content was removed by filtration. 10 mL of ether was stacked on the solution whereby a white solid content was precipitated. This solid content was recrystallized from acetonitrile/ether, thereby obtaining 200 mg of an Iron complex 2 (yield: 75%).

Synthesis Example 3

Synthesis of Iron Complex 3

An AgBF$_4$ (16 mg; 0.063 mmol)/MeCN (1 mL) solution was added to an Iron complex 1 (45 mg; 0.05 mmol)/MeCN (2 mL) solution in a 20 mL Schlenk flask, and this was stirred for one hour. The color of the solution was pale yellow, and the color did not change from beginning to end. The solution was subjected to the celite filtration, and diethyl ether was stacked thereon, and a white solid content was precipitated. The solution was decanted, thereby obtaining the precipitate. This was washed with ether, thereby obtaining an Iron complex 3 (yield: 73%).

ESI-MSESI+: m/z=559.1, 262.1, ESI-: m/z=87.0 (BF$_4^-$)

-continued

Synthesis Example 4

Synthesis of Iron Complex 4

4 g of Me$_3$TACN and 16 ml of ethanol were charged to a 100 mL Schlenk flask. 50 mL of an ethanol solution containing 7.66 g of FeCl$_3$·6H$_2$O was slowly added thereto. Consequently, a yellow microcrystal was precipitated. After this was stirred for about one hour, and the solid content was recovered by way of filtration. The solid content was washed with ether, thereby obtaining a mustard-yellow Iron complex 4 (yield: 83%).

Example 1

Synthesis of Polymethyl Methacrylate (PMMA)

In an atmosphere of nitrogen, a stir bar, 11 mg (0.01 mmol) of Iron complex 2, 0.6 μL (0.005 mmol) of methyl trichloroacetate, 0.2 g (2 mmol) of methyl methacrylate (hereinafter, abbreviated as "MMA"), and 0.1 mL of THF were charged to an evacuation flask. The container was sealed, and the contents were stirred for ten hours while incubating in an oil bath at 80° C. The conversion rate thereof was more than 95%, the produced PMMA had an Mn of 43000, and Mw/Mn=1.5.

Example 2

Synthesis of Polydimethylaminoethyl Methacrylate (PDAEMA)

In an atmosphere of argon, a stir bar, 9 mg (0.01 mmol) of Iron complex 2, and 2.4 μL (0.02 mmol) methyl trichloroacetate were charged to a Schlenk flask, and 0.31 g (2 mmol) of N,N-dimethylaminoethyl methacrylate was added thereto. The container was sealed, and the contents were stirred for three hours while incubating in an oil bath at 80° C. The conversion rate thereof was more than 95%, the produced PDAEMA had a Mn of 13000, and the Mw/Mn=1.4.

Example 3

Polymerization of Polystyrene (PSt)

In an atmosphere of nitrogen, a stir bar, 9 mg (0.01 mmol) of Iron complex 1, and 2.4 μL (0.02 mmol) methyl trichloroacetate were charged to an evacuation flask, and 0.2 g (2 mmol) of styrene was added thereto. The container was sealed, and the contents were stirred for forty hours while incubating in an oil bath at 100° C. The conversion rate thereof was more than 95%, the produced PSt had an Mn of 9000, and the Mw/Mn=1.4.

Example 4

Synthesis of Block Copolymer of Methyl Methacrylate and t-butyl Methacrylate In an atmosphere of nitrogen, a stir bar, 9 mg (0.01 mmol) of Iron complex 1, and 2.8 μL (0.02 mmol) of ethyl 2-bromoisobtanoate were charged to an evacuation flask, and tert-butyl methacrylate was added thereto. The container was sealed, and the contents were stirred for ten hours while incubating in an oil bath at 100° C. The conversion rate thereof was more than 95%, the produced poly(tert-butyl methacrylate) (PtBMA) had an Mn of 54000, and the Mw/Mn=1.6. In an atmosphere of nitrogen, 1 mL of THF was added thereto, and dissolved. Then, 2.0 g (2 mmol) of MMA was added thereto, and reacted at 80° C. for thirty hours. In this reaction, the conversion rate of the monomer was more than 95%, and the produced polymer (PtBMA-b-PMMA) had an Mn of 330000, and the Mw/Mn=1.7.

Figure 1:
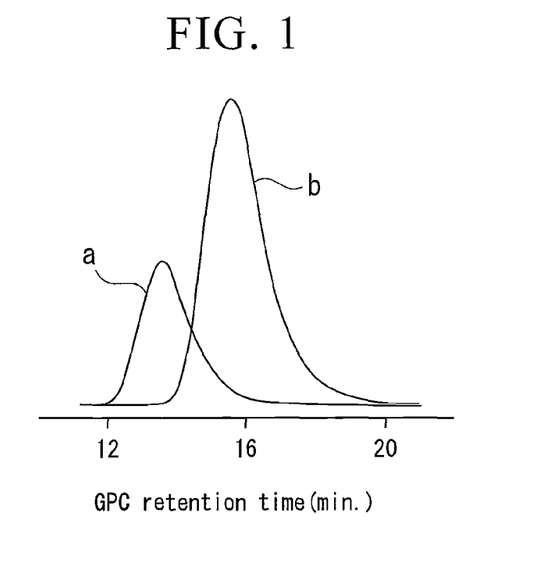
FIG. 1 is a GPC chart with respect to a polymer after and before being block-copolymerized in Example 4.

FIG. 1 shows a GPC chart with respect to a polymer before and after being block-copolymerized. In FIG. 1, "b" refers to a GPC chart before the block-copolymerization (PtBMA), and "a" refers to a GPC chart after the block-copolymerization (PtBMA-b-PMMA). Resulting from the progress of the block-copolymerization, the polymer remarkably shifted to higher molecular weight. Thus, according to the production method of the present invention, a block copolymer could be easily produced based on the polymerization.

Example 5

Catalyst-Recovering and Recycling Experiment

[First Polymerization]

In an atmosphere of nitrogen, a stir bar, 9 mg (0.01 mmol) of Iron complex 1, and 2.4 μL (0.02 mmol) of methyl trichloroacetate were charged to an evacuation flask, and 1.0 g (10 mmol) of MMA was added thereto. The container was sealed, and the contents were stirred for ten hours while incubating in an oil bath at 80° C. The conversion rate thereof was more than 95%, the produced PMMA had an Mn of 72000, and the Mw/Mn=1.5.

[Separation and Recovery of Catalyst from Polymer]

The polymer synthesized in the first polymerization was dissolved in 5 mL of THF, and the solution was added dropwise to 20 mL of methanol, thereby conducting reprecipitation and purification thereof. The precipitated polymer, and the liquid phase including the catalyst were dried, respectively, under reduced pressure. Consequently, 950 mg of the almost colorless purified polymer was obtained, and 35 mg of a yellow solid content was recovered from the liquid phase including the iron complex.

[Second Polymerization]

The polymerization reaction was conducted in the same manner as the first polymerization except that the above-recovered yellow solid content including the iron complex was used. The polymerization quickly proceeded. With regard to the produced PMMA, the conversion rate was 95%, the Mn=39000, and Mw/Mn=1.7.

Figure 2:
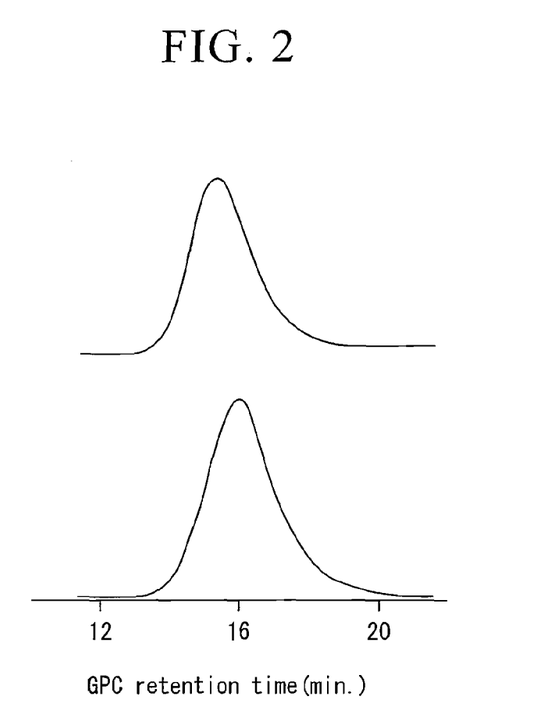
FIG. 2 is a GPC chart with respect to the first polymerization (upper) and the second polymerization (down) in Example 5.

A GPC chart is shown in FIG. 2 with respect to the first polymerization (upper) and the second polymerization (down). Thus, according to the production method of the present invention, the recovered iron complexes were reusable in polymerization, and even such recycled iron complexes could achieve sufficient polymerization.

Example 6

Removal of Iron Based on Polymer Reprecipitation-Purification

In an atmosphere of nitrogen, a stir bar, 9 mg (0.01 mmol) of Iron complex 1, and 2.4 µL (0.02 mmol) methyl trichloroacetate were charged to an evacuation flask, and 1.0 g (10 mmol) of MMA was added thereto. The container was sealed, and the contents were stirred for ten hours while incubating in an oil bath at 80° C. The conversion rate thereof was 95%, the produced PMMA had an Mn of 72000, and the Mw/Mn=1.5.

300 mg of the unpurified polymer was dissolved in 1 mL of THF. The solution was added dropwise to 30 mL of methanol, thereby conducting a reprecipitation-purification. The precipitated polymer was dried, and was again subjected to reprecipitation-purification using 1 mL of THF/30 mL of methanol. The yield of the purified polymer was 260 mg (87%).

Figure 3:
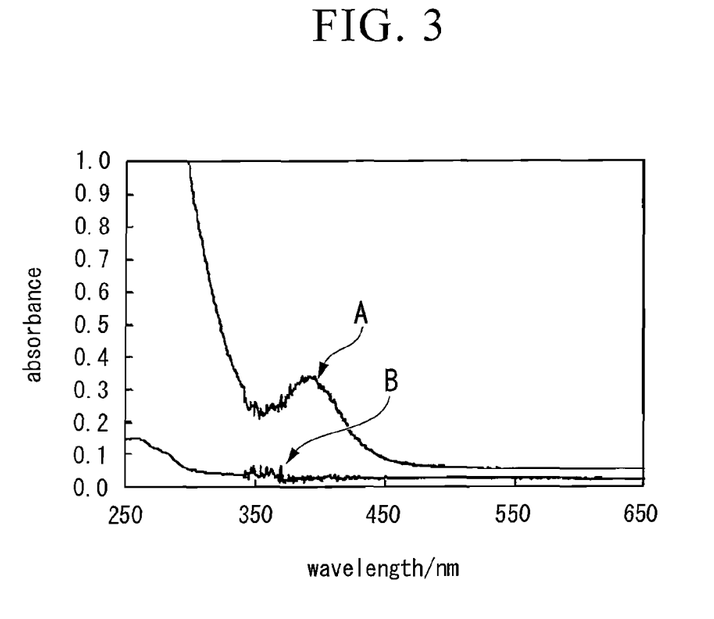
FIG. 3 shows a UV-Vis absorption spectrum with respect to an unpurified polymer (A) and the purified polymer (B) in Example 6.

UV-Vis absorption spectra are shown in FIG. 3 with respect to 10 mg of the unpurified polymer dissolved in 3 mL of dichloromethane (A), and 10 mg of the purified polymer dissolved in 3 mL of dichloromethane (B).

As described above, it was shown that the colored content could be removed from the polymer by way of the reprecipitation-purification while dissolving the content in the solvent whereby a colorless and transparent polymer could be easily obtained. The ICP-MS measurement revealed that the amount of the iron remaining in the polymer was 0.004%.

Example 7

Synthesis of poly(dimethylaminoethyl methacrylate) in Aqueous Medium

A stir bar, and 3 mg (0.0033 mmol) of Iron complex 1 were charged to a 20 mL Schlenk flask, and 0.25 ml of distilled water and 0.25 ml of methanol that were deaerated in an argon stream were added thereto. After the complex was dissolved, a mixture of 0.8 µL (0.0067 mmol) of methyl trichloroacetate and 0.56 mL (3.3 mmol) of dimethylaminoethyl methacrylate (DMAEMA) was added thereto, this was subjected to freeze deaeration two times, and then brought back to normal pressure with argon. The container was sealed, and the contents were stirred for three hours while incubating in an oil bath at 80° C. The conversion rate thereof was 86%; the Mn was 23000; and Mw/Mn was 1.6. The reaction solution was subjected directly to vacuum drying, thereby obtaining 389 mg of a polymer (yield: 83%).

Example 8

Synthesis of Polymethyl Methacrylate Using Iron Complex 3

In a nitrogen atmosphere, a stir bar, 7 mg (0.01 mmol) of Iron complex 3, and 2.8 µL (0.02 mmol) of ethyl 2-bromoisobutanoate were charged to an evacuation flask, and 1.0 g (10 mmol) of MMA was added thereto. The container was sealed, and the contents were stirred for ten hours while incubating in an oil bath at 80° C. The conversion rate thereof was >95%, the produced PMMA had an Mn of 129000, and the Mw/Mn=1.8.

Example 9

Polymerization of Polymethacrylate

A stir bar, 8 mg (0.025 mmol) of Iron complex 4, and 4 mg (0.025 mmol) of azobisisobutylonitrile (hereinafter, abbreviated as "AIBN") were charged to an evacuation flask. After the inside of the system was substituted with argon, a mixture of 0.5 mL (4.8 mmol) of MMA and 0.5 mL of acetonitrile was added thereto in an argon stream. The container was sealed, and the contents were stirred for ten hours while incubating in an oil bath at 60° C. The conversion rate thereof was >95%, the Mn=27000, and the Mw/Mn=1.4.

Example 10

Polymerization of Polystyrene (Pst)

A stir bar, 8 mg (0.025 mmol) of Iron complex 4, and 2 mg (0.012 mmol) AIBN were charged to an evacuation flask. After the inside of the system was substituted with argon, 550 µL (5 mmol) of styrene was added thereto in an argon stream. The container was sealed, and the contents were stirred for twenty hours while incubating in an oil bath at 100° C. Then, the container was opened, and the polymer was dissolved in toluene (the conversion rate thereof >95%; Mn=25000; and Mw/Mn=1.5). The reaction solution was discharged into 30 mL of methanol to conduct reprecipitation-purification. The precipitated polymer was recovered, and vacuum-dried. The yield of Pst was 90%.

Example 11

Synthesis of Polymethyl Methacrylate

A stir bar, 8 mg (0.025 mmol) of Iron complex 4, and 1 mg (0.006 mmol) of AIBN were charged to a 20 mL Schlenk flask. After the inside of the system was substituted with argon, a mixture of 265 mL (2.5 mmol) of MMA and 0.5 mL of acetonitrile was added thereto in an argon stream. The container was sealed, and the contents were stirred for nine hours while incubating in an oil bath at 60° C. Then, the container was opened, and the reaction solution was discharged into 20 mL of methanol, thereby terminating the reaction. The precipitated polymer was recovered, and vacuum-dried (the conversion rate thereof was 50%; Mn=15000; and Mw/Mn=1.5).

Comparative Example 1

The polymerization was conducted in the same manner as Example 11, as described above, except that Iron complex 4 was not added. Consequently, 246 mg of a polymer was obtained (the conversion rate thereof was >95%; Mn=55000; and Mw/Mn=1.9).

In Comparative Example 1, the polymerization reaction was not controlled. Consequently, most of the monomers were reacted when the reaction time reached nine hours, and the produced polymer had a broad range of molecular weight distribution. On the other hand, in Example 11 using Iron complex 4, the polymerization reaction was reliably controlled. Even at the reaction time of nine hours, the polymerization reaction was not completed. It was confirmed that the molecular weight distribution of the produced polymer could be consequently made narrower.

Example 12

Control of Polymer Molecular Weight by Stepwise Addition of Monomer

Figure 4:
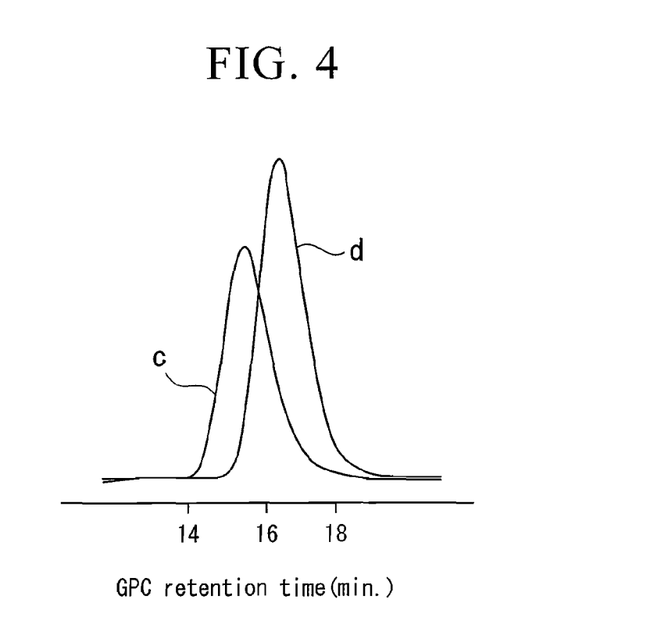
FIG. 4 is a GPC chart with respect to Example 12 wherein MMA was added stepwise.

A stir bar, 8 mg (0.025 mmol) of Iron complex 4, and 1 mg (0.006 mmol) of AIBN were charged to a 20 mL Schlenk flask. After the inside of the system was substituted with argon, a mixture of 0.48 g (4.8 mmol) of MMA and 0.5 mL of acetonitrile was added thereto in an argon stream. The container was sealed, and the contents were stirred for ten hours while incubating in an oil bath at 60° C. Then, this was reacted for ten hours in an oil bath at 80° C. At this point, the monomer conversion rate was more than 95%, the produced polymer (PMMA 1) had an Mn of 34000, and the Mw/Mn=1.2. 1.0 g (10 mmol) of MMA, and 1 mL of acetonitrile were added to the container, and this was further reacted for fifty hours at 80° C. The reaction solution after the reaction was analyzed. The monomer conversion rate was more than 95%, the produced polymer (PMMA 2) had an Mn of 76000, and the Mw/Mn=1.3. In FIG. 4, GPC charts are shown with respect to the stepwise addition of MMA. In FIG. 4, "d" shows a GPC chart with respect to after the first addition of MMA (PMMA 1) while "c" shows a GPC chart with respect to the second addition of MMA (PMMA 2).

Example 13

Synthesis of Block Copolymer that Includes Polymethyl Methacrylate and Polybutyl Methacrylate A stir bar, 8 mg (0.024 mmol) of Iron complex 3, and 1 mg (0.006 mmol) of AIBN were charged to an evacuation flask equipped with an inlet adapter with a 3-way stopcock. After the inside of the system was substituted with argon, a mixture of 720 µL (5 mmol) of n-butyl acrylate and 0.5 mL of acetone was added thereto in an argon stream. The container was sealed, and the contents were stirred for ten hours while incubating in an oil bath at 100° C. At this point, the conversion rate of the butyl acrylate monomer was >95%, and a polymer (PBA) having an Mn of 53000 and Mw/Mn of 1.6 was obtained. 530 µL (5 mmol) of MMA was further added to the reaction mixture, and this was stirred for fifteen hours while incubating in an oil bath at 100° C. At this point, the conversion rate of MMA was >95%. The produced block copolymer polymer (PBA-b-PMMA) had an Mn of 89000 and Mw/Mn of 1.8.

Figure 5:
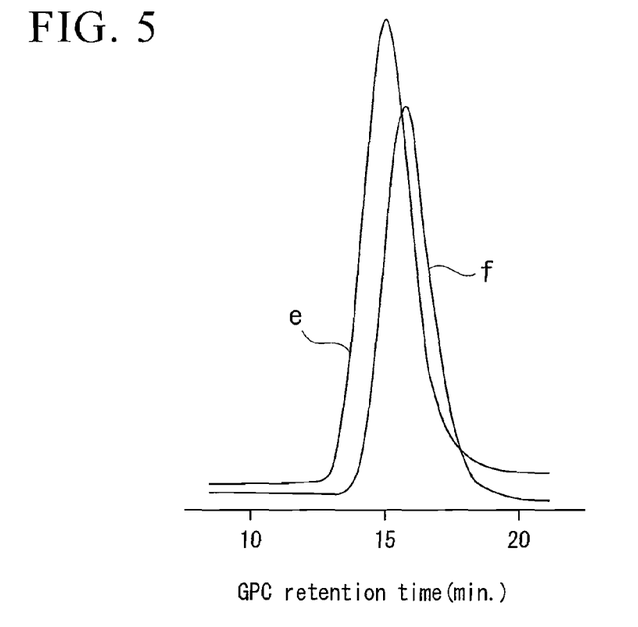
FIG. 5 is a GPC chart with respect to a polymer before and after being block-copolymerized in Example 13.

GPC charts are shown in FIG. 5 with respect to before and after the block copolymerization. In FIG. 5, "f" shows the GPC chart with respect to before the block copolymerization (PBA) while "e" shows a GPC chart with respect to after the block copolymerization (PBA-b-PMMA). According to the production method of the present invention, a block copolymer could be easily produced by the polymerization.

Example 14

Recovery of Iron Complex 4 and Polymerization Reusing the Same

[First Polymerization]
A stir bar, 8 mg (0.025 mmol) of Iron complex 4, and 1 mg (0.006 mmol) of AIBN were charged to a 20 mL Schlenk flask. After the inside of the system was substituted with argon, a mixture of 500 mg (0.5 mmol) of MMA and 0.5 mL of acetonitrile was added thereto in an argon stream. The container was sealed, and the contents were stirred for twenty hours while incubating in an oil bath at 60° C. The conversion rate thereof was >95%, and the produced polymer (PMMA) had an Mn of 70000, and Mw/Mn of 1.4.

[Separation of Complex from Polymer and Recovery Thereof]
The polymer synthesized in the above first polymerization was dissolved in 2 mL of THF, and this was added dropwise to 20 mL of methanol to conduct reprecipitation-purification. The precipitated polymer, and the liquid phase containing the catalyst were vacuum-dried, respectively, whereby 465 mg of an almost colorless purified polymer and 27 mg of a yellow solid including the iron complex were recovered.

[Polymerization Using the Recovered Iron Complex 4: Second Polymerization]
The polymerization reaction was conducted in the same manner as the first polymerization, as described above, except that 27 mg of the yellow solid including the iron complex, which was recovered in the first polymerization, was used therein. The polymerization quickly proceeded. The conversion rate was >95%, and the produced PMMA had an Mn of 55000 and Mw/Mn of 1.8.

Figure 6:
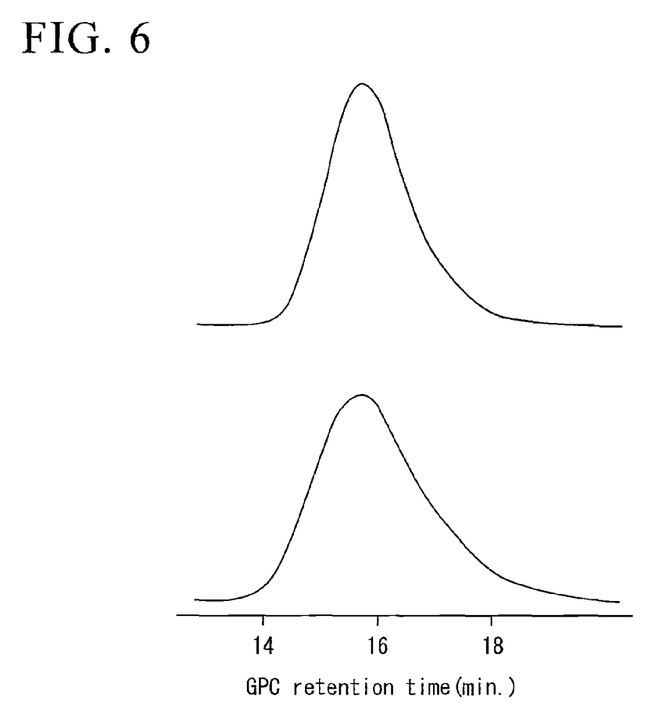
FIG. 6 is a GPC chart with respect to the first polymerization (upper) and the second polymerization (down) in Comparative Example 14.

In FIG. 6, GPC charts are shown with respect to the first polymerization (upper) and the second polymerization (down). Thus, according to the production method of the present invention, the recovered iron complex could be reused for the polymerization, and it was evident that even the recycled complex could achieve a preferable polymerization.

Example 15

Synthesis of Block Copolymer by Alternation of R-ATRP (Synthesis of Macro-Initiator) and ATRP

[Synthesis of Macro-Initiator by R-ATRP Using the Iron Complex 4]
A stir bar, 8 mg (0.025 mmol) of Iron complex 4, and 2 mg (0.012 mmol) AIBN were charged to an evacuation flask. After the inside of the system was substituted with argon, a mixture of 0.5 mL (4.8 mmol) of MMA and 0.5 mL of acetonitrile was added thereto in an argon stream. The container was sealed, and the contents were stirred for twenty hours while incubating in an oil bath at 80° C. At this point, the conversion rate thereof was >95%; Mn=35000; and Mw/Mn=1.3. This was subjected to reprecipitation-purification once using THF (2 mL)/MeOH (30 mL), and the precipitate was dried, thereby separating a polymer.

[Synthesis of Block Copolymer by ATRP Using the Produced Polymer as a Macro-Initiator and Iron Complex 1]
In the nitrogen atmosphere, 9 mg (0.01 mmol) of Iron complex 1; 1 mL of a THF solution including 350 mg (0.01 mmol) of the macro-initiator (PMMA-C1; Mn=35000; and Mw/Mn=1.3) synthesized using Iron complex 4; and 0.64 g (5 mmol) of tert-butyl methacrylate were charged to a 20 mL Schlenk flask. The container was sealed, and the contents were stirred for thirty hours while incubating in an oil bath at 100° C. At this point, the monomer conversion rate was 89%, and the produced PMMA-b-PtBMA had an Mn of 84000, and the Mw/Mn=1.4.

Figure 7:
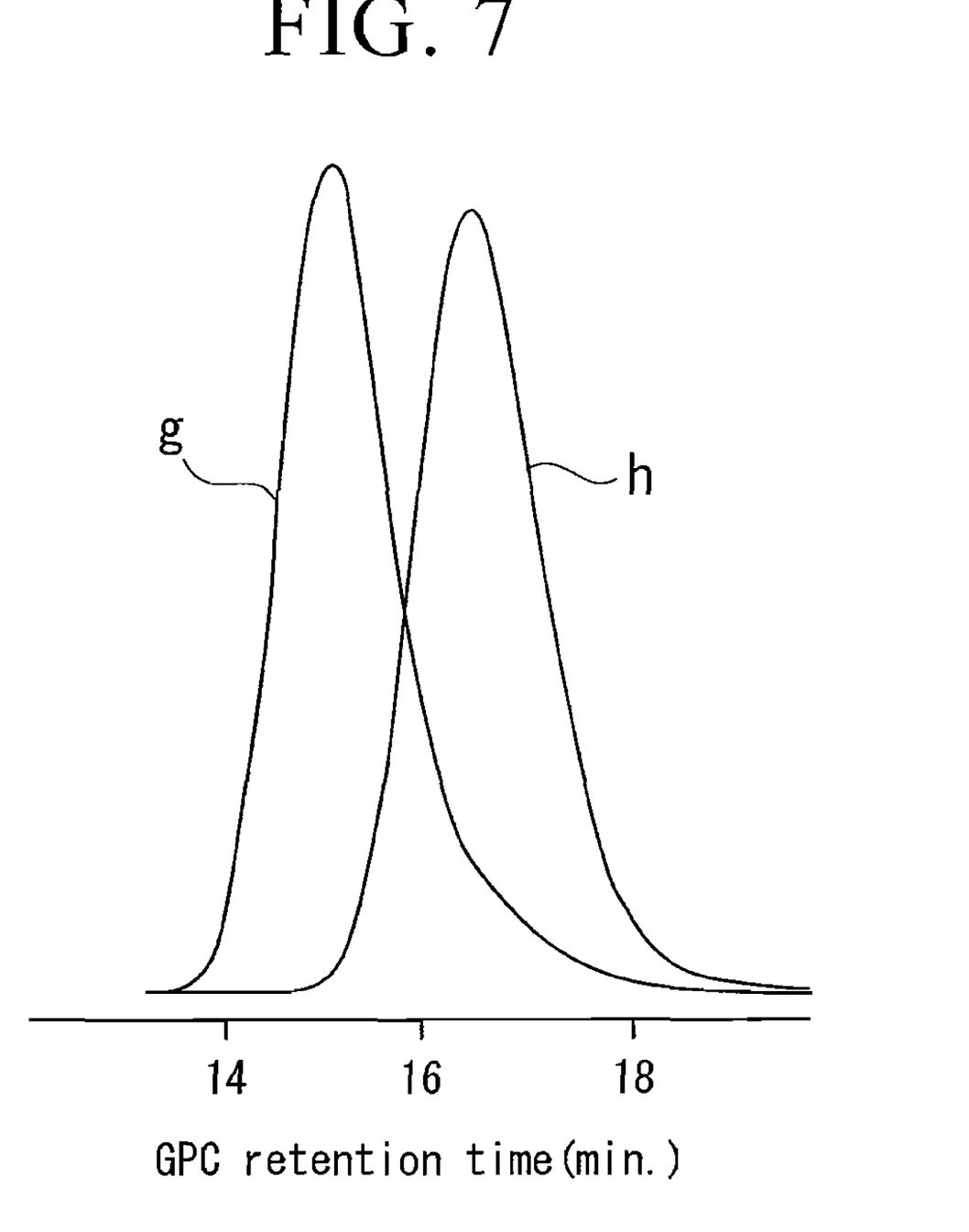
FIG. 7 is a GPC chart with respect to a polymer before and after being block-copolymerized in Example 15.

GPC charts are shown in FIG. 7 with respect to before and after the block copolymerization. In FIG. 7, "h" shows the GPC chart with respect to before the block copolymerization (PMMA) while "g" shows a GPC chart with respect to after the block copolymerization (PMMA-b-PtBMA). Thus, according to the production method of the present invention, a block copolymer could be easily produced by the polymerization.

Example 16

Separation of Iron Complex from Polymer after Styrene Polymerization Using Iron Complex 4

A stir bar, 16 mg (0.048 mmol) of Iron complex 4, and 3.9 mg (0.024 mmol) AIBN were charged to a 15 mL evacuation flask. After the inside of the reaction container was substituted with nitrogen, 1.0 g (9.6 mmol) of styrene monomers were added thereto using a syringe in a nitrogen stream. The mixture solution was heated in an oil bath at 100° C., and reacted for thirty hours while stirring (conversion rate=98%; Mn=23,000; and Mw/Mn=1.3). 4 mL of THF was added to the solution after the polymerization. The solution was added dropwise to 30 mL of methanol, thereby precipitating a polymer. A solid content of Pst was recovered by filtration, and this was vacuum-dried at 60° C., thereby obtaining unstained white powder. The amount of the iron remaining in the powder polystyrene was measured by the ICP-MS. The amount thereof was 9 ppm with respect to the amount of the iron charged therein of $2.6 \times 10^3$ ppm (calculated value). Thus, it was shown that, based on one operation of precipitation, the iron complexes could be almost completely isolated from the polymer while an unstained polymer could be easily obtained. For comparison, the same experiment was conducted using a known iron-based catalyst (non-patent document 8) instead of Iron complex 4. However, such an unstained polymer could not be obtained.

INDUSTRIAL APPLICABILITY

As described above, according to the method of producing a polymer of the present invention, the above-described iron complex and radical generator are used. Therefore, it is not required to use the other ligands, the polymerization reaction can be greatly simplified, and the radical polymerization reaction can be conducted in a quantitative manner due to excellent catalytic activity of the iron complex. Moreover, the produced polymer has active termini that cannot be obtained by general radical polymerizations. Accordingly, by adding the other radical-polymerizable monomers thereto after the quantitative polymerization, a block copolymer can be easily produced. Furthermore, the iron complexes can be efficiently dissolved in a solvent phase in a simple process of reprecipitating the polymer after the completion of the polymerization reaction whereby the iron complexes can be easily recovered and recycled as catalysts. Additionally, environmental pollution can be prevented in the present invention, compared to the toxic metal ion system using a copper complex or the like, and the post-treatment process to the produced polymer can be simplified.

That is, the above-described iron complex is used in the conventional radical polymerization systems in the present invention. Accordingly, the present invention not only brings about many advantages in controlling a polymerization reaction as an industrial process, but can also achieve higher efficiency of the industrial process and resource saving. Additionally, the present invention is very useful in terms of reducing environmental pollution.

Thus, the present invention is highly applicable to various industrial processes, and therefore, has a great deal of potential in industry.

The invention claimed is:

1. A method of producing a polymer, comprising: polymerizing at least one type of a radical-polymerizable monomer in the presence of a radical-polymerization initiator by using as a polymerization catalyst at least one iron complex selected from the group consisting of iron complexes represented by general formulas (1) to (5) and (7):

wherein any one of Fe is a bivalent cation; $X_1$ represents $Cl^-$, $Br^-$ $I^-$; $X_2$ represents $Cl^-$, $Br^-$, $CN^-$ or $S^-$—Ph where Ph represents a phenyl group; and R represents a methyl group or an ethyl group;

wherein any one of Fe is a bivalent cation; $X_3$ represents $Cl^-$, $Br^-$ or $I^-$; R represents a methyl group or an ethyl group; and $A^-$ represents an anion;

wherein Fe is a bivalent cation; $X_4$ represents $Cl^-$, $Br^-$, $CN^-$, $S^-$—Ph or $S^-$—$R_1$ where Ph represents a phenyl group and $R_1$ represents a methyl group or an ethyl group; $L_1$ represents $CH_3CN$ or CO; R represents a methyl group or an ethyl group; and A— represents an anion;

wherein Fe is a bivalent cation; $X_5$ represents $Cl^-$, $Br^-$, $CN^-$, $S^-$—Ph or $S^-$—$R_1$ where Ph represents a phenyl group and $R_1$ represents a methyl group or an ethyl group; $D^+$ represents a cation; and R represents a methyl group or an ethyl group;

(5)

wherein Fe is a bivalent cation; $X_6$ represents $Cl^-$, $Br^-$, $CN^-$, $S^-$—Ph or $S^-$—$R_1$ where Ph represents a phenyl group and $R_1$ represents a methyl group or an ethyl group; $L_2$ represents $CH_3CN$ or CO; and R represents a methyl group or an ethyl group; and (7)

wherein any one of Fe is a tervalent cation; $X_8$ represents $Cl^-$, $Br^-$ or $I^-$; and R represents a methyl group or an ethyl group.

2. The method of producing a polymer according to claim 1, wherein $A^-$ in general formula (2) or (3) is a monovalent anion selected from the group consisting of $PF_6^-$—, $SbF_6^-$, $BF_4^-$, $BrO_3^-$, $NO_3^-$, $Cl^-$, $Br^-$, and F.

3. The method of producing a polymer according to claim 1, wherein the cation $D^+$ in general formula (4) is a monovalent cation selected from the group consisting of a cationic complex including a bivalent iron cation, an organic onium ion, and an alkali metal ion.

4. The method of producing a polymer according to claim 1, wherein at least one iron complex represented by any one of general formulas (1) to (5), and a radical polymerization initiator selected from the group consisting of an active halogen compound of an α-halogenocarbonyl compound, an α-halogenocarboxylic acid ester, a halogen methylarene active methylene compound, an active methylene-type halogen methylarene compound, and a polyhalogenated alkane compound are used.

5. The method of producing a polymer according to claim 1, wherein at least one iron complex represented by general formula (7), and a radical polymerization initiator selected from the group consisting of an peroxide and an azo-based compound are used.

6. The method of producing a polymer according to claim 5, wherein an organic compound having a cyano group is added.

7. The method of producing a polymer according to claim 1, wherein two or more types of radical-polymerizable monomers are used as the radical-polymerizable monomer to conduct block copolymerization.

8. The method of producing a polymer according to claim 1, wherein the polymerization is conducted in an aqueous medium.

9. The method of producing a polymer according to claim 8, wherein the aqueous medium contains a water-soluble organic solvent.

10. The method of producing a polymer according to claim 1, wherein the polymerization is conducted in an organic medium.

11. The method of producing a polymer according to claim 1, wherein the polymerization is conducted without using a medium.

12. The method of producing a polymer according to claim 1, further comprising:
washing the produced polymer with water and/or a water-soluble organic solvent to recover the iron complex included in the polymer; and
conducting polymerization using the recovered iron complex.

* * * * *